US009027009B2

(12) United States Patent
Raikin et al.

(10) Patent No.: US 9,027,009 B2
(45) Date of Patent: May 5, 2015

(54) PROTECTING THE INTEGRITY OF BINARY TRANSLATED CODE

(75) Inventors: Shlomo Raikin, Ofer (IL); Lihu Rappoport, Haifa (IL); Joseph Nuzman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/991,894

(22) PCT Filed: Dec. 29, 2011

(86) PCT No.: PCT/US2011/067974
§ 371 (c)(1),
(2), (4) Date: Jun. 5, 2013

(87) PCT Pub. No.: WO2013/101125
PCT Pub. Date: Jul. 4, 2013

(65) Prior Publication Data
US 2014/0245273 A1    Aug. 28, 2014

(51) Int. Cl.
*G06F 9/45*        (2006.01)
*G06F 21/64*       (2013.01)

(52) U.S. Cl.
CPC *G06F 21/64* (2013.01); *G06F 8/52* (2013.01); *G06F 8/41* (2013.01)

(58) Field of Classification Search
CPC ............ G06F 12/08; G06F 8/41; G06F 8/52; G06F 21/64
USPC ......................................... 717/127, 131, 151
See application file for complete search history.

(56) References Cited

U.S. PATENT DOCUMENTS

| 5,900,017 | A | * | 5/1999 | Genduso et al. | 711/146 |
| 5,923,898 | A | * | 7/1999 | Genduso et al. | 710/6 |
| 6,260,118 | B1 | * | 7/2001 | Genduso et al. | 711/146 |
| 6,668,309 | B2 | * | 12/2003 | Bachand et al. | 711/146 |
| 2009/0150335 | A1 | | 6/2009 | Latorre et al. | |
| 2010/0333090 | A1 | | 12/2010 | Wright et al. | |
| 2011/0153307 | A1 | | 6/2011 | Winkel et al. | |
| 2011/0238403 | A1 | | 9/2011 | Sargaison et al. | |

OTHER PUBLICATIONS

PCT International Search Report for PCT Counterpart Application No. PCT/US2011/067974, 3 pgs., (Sep. 27, 2012).

(Continued)

*Primary Examiner* — Ted T Vo
(74) *Attorney, Agent, or Firm* — Blakely, Sokoloff, Taylor & Zafman LLP

(57) ABSTRACT

The technologies provided herein relate to protecting the integrity of original code that has been optimized. For example, a processor may perform a fetch operation to obtain specified code from a memory. During execution, the code may be optimized and stored in a portion of the memory. The processor may obtain the optimized code from the portion of the memory. An entry of a first table may be modified to indicate a relationship between the particular code and the optimized code. One or more entries of a second table may be modified to specify the one or more physical memory locations. Each of the one or more entries of the second table may correspond to the entry of the first table. The processor may execute the optimized code when each of the one or more entries of the second table are valid.

20 Claims, 7 Drawing Sheets

(56) References Cited

OTHER PUBLICATIONS

PCT Written Opinion of the International Searching Authority for PCT Counterpart Application No. PCT/US2011/067974, 4 pgs., (Sep. 27, 2012).

PCT Notification concerning Transmittal of International Preliminary Report on Patentability (Chapter I of the Patent Cooperation Treaty) for PCT Counterpart Application No. PCT/US2011/067974, 6 pgs., (Jul. 10, 2014).

\* cited by examiner

US 9,027,009 B2

PROTECTING THE INTEGRITY OF BINARY TRANSLATED CODE

CROSS-REFERENCE TO RELATED APPLICATION

This patent application is a U.S. National Phase Application under 35 U.S.C. §371 of International Application No. PCT/US2011/067974, filed Dec. 29, 2011, entitled PROTECTING THE INTEGRITY OF BINARY TRANSLATED CODE.

TECHNICAL FIELD

Some embodiments of the invention generally relate to the operation of processors. More particularly, some embodiments of the invention relate protecting the integrity of binary translated code.

BACKGROUND

In certain situations, a processor may dynamically optimize portions of code to increase performance during execution. For example, a processor may optimize code by reducing the instruction path length, reducing repetitive code, modifying branching instructions, and so forth. Current techniques to dynamically optimize code are often inefficient and limited in their ability to protect the integrity of the original code in a multi-core environment.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
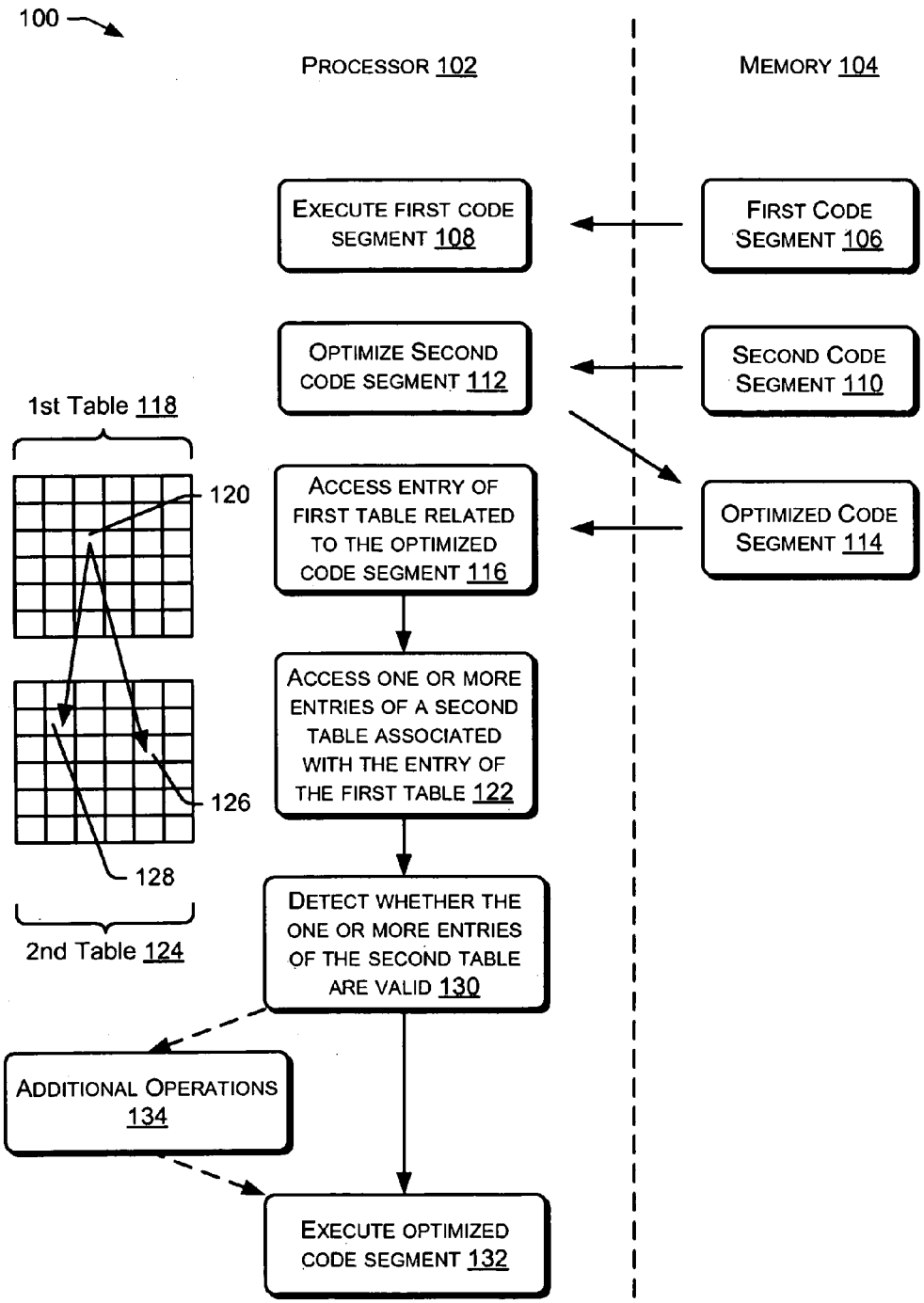
FIG. 1 illustrates an example framework to protect the integrity of original program code that has been optimized by a processor.

The technologies described herein relate to protecting the integrity of original code that has been optimized. In particular, a processor may obtain code from a particular memory location. The particular memory location may be a location in a memory associated with the processor, such as random access memory (RAM) that is accessible by the processor. For example, the processor may perform a fetch operation to obtain code (e.g., specified instructions) from the memory. In some cases, the processor may optimize the code and store the optimized code in a protected portion of the memory, such as a translation cache. At a later time, the processor may obtain the optimized code from the protected portion of the memory. However, the code in the particular memory location may be altered by a program (e.g., second code) before execution of the optimized code. Executing code from the altered memory location may cause a computational error, disrupt performance, and/or create inefficiencies in the execution of a program code.

To protect the integrity of the instructions being executed, one or more data structures, such as tables, directories, matrices, or other suitable data structures, may be used to store data indicating whether or not changes have been made to physical memory locations that include optimized code. While the following implementations are described using tables as example data structures, any other suitable types of data structures may be used. In an illustrative implementation, a first table may be generated that includes a plurality of entries. The first table may be referred to as an instruction pointer to translated code pointer (IP-to-TCP) table. At least a portion of the entries in the first table indicate a relationship between a first instruction pointer to original code of a program and a second instruction pointer to the corresponding optimized code. Each time the processor (the term processor includes firmware that runs on behalf of the processor) optimizes a segment of code, the processor may modify the table by adding new entries or modifying existing entries to include instruction pointers to optimized segments of program code.

Thus, the first table may hold an entry for translated regions that may be in the pipeline. Each entry in the first table holds a number of pointers to a second table, based on the number of pages used to span a translated region. The first table may be used to redirect execution from the original code (e.g., pointed to by the IP) to the translated code (e.g., TCP). Before redirecting execution, a determination may be made whether memory pages in which the original code resides are valid using the second table.

The processor may generate the second table that includes one or more entries that correspond to a particular entry of the first table. The second table may be referred to as a physical page snoop table (PPST). The number of entries of the second table that correspond to an entry of the first table may depend on a number of pages of physical memory specified by each entry of the first table. At least a portion of the entries of the second table may specify a respective physical memory location that stores portions of code from which the translated code originated.

The second table may thus hold physical pages from which the translated code in the pipeline originated. The second table maintains an inclusion property with respect to the pipeline (e.g., pages from the original code whose translated code is being executed are to reside in the second table). The second table may include one or more of a valid bit, a tag-physical page number, a snoop hit bit, or a version identifier (vid). In some implementations, the second table may be organized as a cache. A snoop hitting an entry in the second table may cause execution of any optimized region which is currently in the pipe to be aborted.

The processor may also generate a third table that includes a plurality of entries indicating physical memory locations of respective optimized code produced by a plurality of cores. The third table may be referred to as a cross-modifying code guard cache (XGC). The plurality of cores may be associated with a single processor or with multiple processors. Thus, as each core modifies code stored in memory, an entry to the third table is added or modified to indicate the modification to the particular physical memory location.

The third table may hold originating physical code pages that were translated. When a new translation is created, a determination may be made verifying whether the originating physical pages exist in the third table. To conserve storage space, each entry may serve more than one page, with a snoop hit bit per page. In some implementations, each memory write may snoop the third table. The XGC may be used in systems that implement a snoop filter. In systems that implement a snoop filter, the PPST may ignore any invalidation snoop that originates as a result of evicting a line from the snoop filter. Systems that do not implement a snoop filter can function without an XGC. If a hit occurs in the third table, the following operation may occur: (1) the snoop hit bit for the page may be set, (2) processing cores of the processor may be informed that the page was hit by a write to stop any in-flight translated code region execution, which may mark the snoop hit bit in the third table. The write may be performed after the operation has completed. In a distributed coherency system, the third table may reside in a location where write transactions may be observed. For example, if a local copy of a translated page resides in an exclusive or a modified state, write transactions may be satisfied locally. Satisfying write transactions locally may be prevented to enable the XGC to detect collisions. When a translation is read from the software translation cache, if the snoop hit bit of one of the originating pages is set, the translation is discarded and not used.

In an illustrative implementation, upon optimization/translation of code of a program, a processor may include logic to cause an entry of the first table to hold one or more pointers to respective entries of the second table specifying physical pages of memory storing original code corresponding to code that has been translated. The processor may also include logic to cause an entry of the third table to indicate the page of physical memory that stored the original code corresponding to the code that has been translated. Before executing the translated code, the processor may access one or more entries of the first table to identify corresponding entries of the second table associated with the translated code. If any of the entries of either the first table or the second table are invalid, then the processor halts execution of the translated code. In some implementations, the processor may not check if the entry in the XGC is valid, because an invalidation of an XGC entry may cause any relevant entries in the second table (PPST) to be invalidated. In other implementations, when the entries of the first table and the second table are valid, the processor may include logic to detect whether the entries of the third table corresponding to the pages of memory storing the original code are valid. If the entries of the third table are not valid, then the processor stops execution of the translated code. When the entries of the third table are valid, the processor may include logic to detect whether the mapping in the virtual to physical page tables has been modified and/or whether attributes of the virtual to physical page tables have changed. When the virtual to physical page tables are unchanged, the processor executes the translated code. Otherwise, the processor may abort execution of the translated code and may execute the original code.

Thus, the techniques described herein prevent a processor from executing translated code if the originating code has been modified. In this way, the processor may operate more efficiently by reducing processing errors and delays.

FIG. 1 illustrates an example framework 100 to protect the integrity of original program code that has been optimized by a processor. In particular, the framework 100 includes a processor 102 and memory 104 accessible by the processor 102.

In some implementations, the memory 104 may be random access memory (RAM) accessible by the processor 102. The processor 102 may execute code from the memory 104 by retrieving code segments from the memory 104, such as via a fetch instruction. The code segments may include one or more instructions to be executed by the processor 102. The processor 102 may include one or more cores formed on a single die.

The memory 104 may store a number of code segments that may be associated with one or more programs. In an illustrative implementation, the memory 104 stores a first code segment 106 that is retrieved by the processor 102. At 108, the processor 104 may execute the first code segment 106. Additionally, the memory 104 may store a second code segment 110. At 112, the processor 104 may optimize the second code segment 110 and store the optimized version of the second code segment 110 as optimized code segment 114.

Before executing the optimized code segment 114, at 116, the processor 102 may access an entry of a first table 118 that is associated with the optimized code segment 114, such as entry 120. In particular, the first table 118 may include a number of entries associated with respective translated regions of code. In some cases, the translated regions of code are in an instruction pipeline of the processor 102. The first table 118 may be referred to as an instruction pointer to translated code pointer (IP-to-TCP) table. The first table 118 is used to redirect execution from the original code to optimized code. To illustrate, the entry 120 may redirect execution of the second code segment 110 to execution of the optimized code segment 114. Each pointer of the entries of the first table 118 may include a physical-page snoop table (PPST) set, a PPST way, and PPST version identifier. The PPST set and PPST way are pointers into the PPST table to identify the original physical address from which code was optimized. The PPST version identifier may be used when a new translation is to be inserted in to the PPST and a valid translation is to be replaced out. In this situation, the PPST version identifier may be incremented. When looking up the IP-to-TCP and obtaining the PPST pointers, in addition to checking that the PPST entry is valid and the snoop-hit bit is not set, the PPST version identifier may also be checked. If the PPST version identifier is incorrect (e.g., a mismatch is identified between what the value of the PPST version identifier and the expected value) the execution may be aborted.

Entries (e.g., PPST set and PPST way) of the first table 118 may include one or more references, such as pointers, to a second table 124. The second table may be referred to as a physical-page snoop table (PPST). For example, as shown in the illustrative example of FIG. 1, the entry 120 of the first table 118 includes pointers to entry 126 and entry 128 of the second table 124. Accordingly, at 126, the processor 102 may access one or more entries of the second table 124 that are associated with the entry of the first table 118. The second table 124 may include entries indicating physical pages of the memory 104 from which optimized code in the instruction pipeline of the processor 102 originated. To illustrate, the entries 126 and 128 may specify the pages of the memory 104 storing the second code segment 110. Entries of the first table may include a valid bit, bits indicating a physical page number, a snoop hit bit, and a version identifier. In some implementations, the version identifier may be replaced by back pointers to the IP-to-TCP table. When an IP-to-TCP is accessed and a PPST index is obtained, the back pointers from the PPST to IP-to-TCP may be checked to verify that the PPST entry belongs to that IP-to-TCP entry. Note that the PPST to. IP-to-TCP is a one-to-many mapping and therefore multiple back pointers may be used to prevent re-use of the version-id. In some cases, the second table 124 may be organized as a cache of the processor 104.

At 130, the processor 104 may detect whether the one or more entries of the second table 124 are valid. For example, the processor 102 may detect whether a valid bit of the entries 126, 128 has a particular value, such as a binary one. If the valid bit of the entries 126, 128 is not set to the particular, value, the processor 102, at 132, may proceed to execute the optimized code segment 114. When the processor 102 detects that the valid bit of at least one of the entries 126, 128 holds the particular value, e.g., indicating that the entry is not valid, the processor 102 may abort the execution of the optimized code segment 114. The processor 102 may then proceed to perform an error correction process to ensure that the second code segment 110 is properly executed.

In certain implementations, the processor 102 may perform additional operations 134 before executing optimized code. For example, the processor 102 may access one or more entries of a third table (not shown in FIG. 1) to detect whether another processor has modified the original code from which the translated code originated. In another example, the processor 102 may detect whether certain virtual to physical page table attributes have been modified before executing optimized code.

Figure 2:
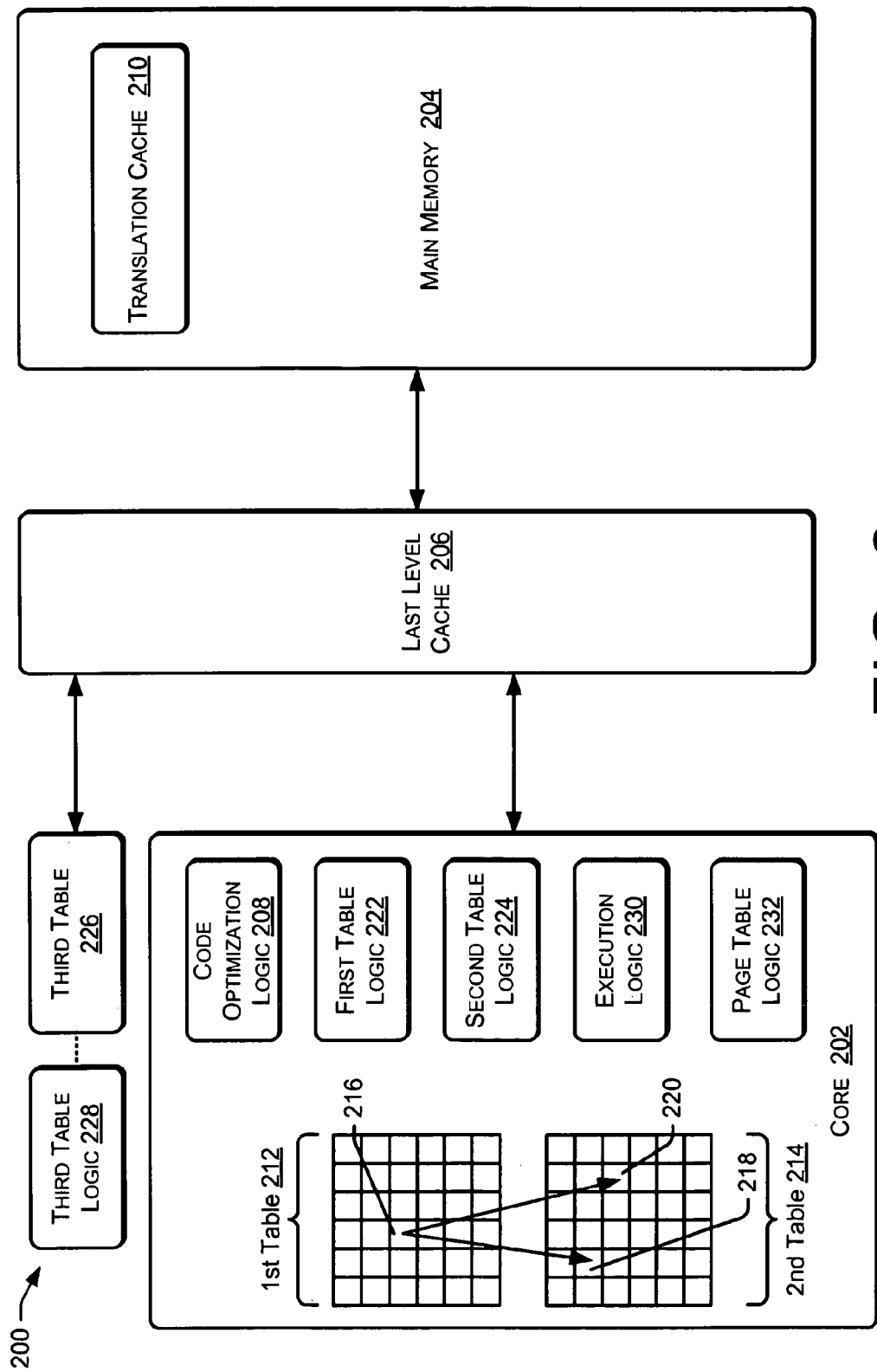
FIG. 2 illustrates an example architecture to protect the integrity of original program code that has been optimized by a processor.

FIG. 2 illustrates an example architecture 200 to protect the integrity of original program code that has been optimized by a processor. The architecture 200 includes a core 202 and main memory 204 accessible by the core 202. The core 202 may be one of a plurality of cores associated with a particular processor or one of a plurality of cores associated with multiple processors. The architecture 200 also includes a last level cache 206. The last level cache 206 may store data shared by a plurality of cores including the core 202. The core 202 may also include a number of additional caches local to the core 202.

The core 202 may include code optimization logic 208 to optimize certain segments of code stored by the main memory 204. For example, the code optimization logic 208 may optimize segments of code by modifying branching instructions, consolidating a group of instructions into fewer instructions, and so forth. The optimization logic 208 may store optimized code in a protected region of the main memory 204, such as translation cache 210.

The core 202 may also include a first table 212 (e.g., IP-to-TCP table) that includes entries specifying a relationship between memory locations storing optimized code segments and memory locations storing the original code segments from which the optimized code originated. The core 202 may also include a second table 214 (e.g., PPST) that includes entries indicating physical memory pages storing the original code segments for optimized code segments in the instruction pipeline of the core 202. Entries in the first table 212 may point to one or more entries of the second table 214. The number of entries in the second table 214 pointed to by a respective entry in the first table 212 may depend on a number of pages allowed to span a translated region. Entries of the first table 212 may include a number of entries associated with respective translated regions of code. In some cases, the translated regions of code are in an instruction pipeline of a processor. The second table 214 may include entries indicating physical pages of the memory 204 from which optimized code in the instruction pipeline of the processor 102 originated. In an illustrative example shown FIG. 2, entry 216 in the first table 212 points to entry 218 and entry 220 in the second table 214.

The core 202 may also include first table logic 222 to add entries to a first table 212, remove entries from the first table 212, and modify entries of the first table 212. For example, for each code segment in the instruction pipeline of the core 202 that is optimized by the optimization logic 208, the first table logic 222 may generate an entry of the first table 212 indicating a relationship between an instruction pointer of the original code segment and an instruction pointer of the optimized code segment. To illustrate, the entry (e.g., the entry 216) generated by the first table logic 222 may include a pointer to physical memory locations of the translation cache 210 storing optimized code that is related to certain physical memory locations of the main memory 204 storing the original code from which the optimized code originates. In this way, when the core 202 initiates execution of a particular code segment, the core 202 may access an entry in the first table 212 associated with the original code segment and be redirected to the optimized code segment for execution.

In some scenarios, the first table logic 222 may detect whether the pages of the main memory 204 storing the originating code for the optimized code already have a corresponding entry in the first table 212. If so, the first table logic 222 may modify the corresponding entry (e.g., the entry 216) in the first table 212 that corresponds to the physical pages of memory storing the originating code. The first table logic 222 may also modify the pointers to entries (e.g., entries 218 and 220) of the second table 214. When the second table 214 does not include an entry for pages of the main memory 204 that have been optimized, the second table logic 224 may add an entry (e.g., the entry 220) corresponding to the pages. In some situations, the second table 214 may include space for an additional entry and the second table logic 224 may generate the entry for the pages by adding an entry (e.g., the entry 220) to the second table 214. In other cases, the second table 214 may not include space for a new entry and the second table logic 224 may remove an existing entry of the second table 214 to make space to add the entry (e.g., the entry 220) to the second table 214.

The core 202 also includes second table logic 224 to generate entries (e.g., entries 218 and 220) of the second table 214. The second table logic 224 may detect when code from the main memory 204 has been optimized by the core 202 and store the physical memory pages corresponding to the original code in one or more entries of the second table 214. In some cases, when the second table 214 already includes an entry corresponding to a page of original code that has been optimized, the second table logic 224 may modify the entry (e.g., one of the entries 218 or 220) of the second table 214 to reflect any changes according to the newly optimized code, such as modifying a version identifier. The version id may be modified when replacing an existing entry with a new one. The PPST may not be modified if a page is already optimized—the action is taken in the IP-to-TCP by linking the IP-to-TCP entry to an existing PPST entry instead of to a newly created PPST entry. In situations where the second table 214 does not include an entry for a physical memory page that has been optimized, the second table logic 224 may add an entry (e.g., one of the entries 218 or 220) to the second table 214. When the second table 214 includes sufficient space, the second table logic 224 may add the entry to the second table. In scenarios where the second table 214 lacks sufficient space to add an entry, the second table logic 224 may remove an entry from the second table 214 before adding the entry corresponding to the newly optimized code, and the version identifier may be incremented.

The architecture 200 also includes a third table 226 (e.g., XGC) that includes entries for physical memory pages of originating code that have been optimized by a plurality of cores including the core 202. Additionally, the architecture 200 includes third table logic 228 to add, remove, or modify entries of the third table 226. To illustrate, the third table logic 228 may receive messages from one or more cores, including the core 202, that physical memory pages stored in the main memory 204 have been optimized. In response to the messages, the third table logic 228 may generate entries for inclusion in the third table 226 indicating the physical memory pages. Thus, when the core 202 optimizes a code segment of a particular program, the third table logic 228 may receive a message from the core 202 indicating that the code segment has been optimized and the third table logic 228 may then update the third table 226 to indicate the physical memory pages associated with the code segment. Additionally, the third table logic 228 may receive messages from other cores indicating code segments that have been optimized and may update the third table 226 to indicate the physical memory pages associated with the code segments optimized by the other cores.

The core 202 also includes execution logic 230 to execute instructions associated with code segments stored in the main memory 204. The execution logic 230 may obtain instructions from the main memory 204 with a fetch instruction to obtain data from one or more locations of the main memory 204. The execution logic 204 may retrieve the instructions from the main memory 204 according to instructions stored in a program counter or instruction register. Instructions retrieved from the main memory 204 may be placed into an instruction pipeline of the core 202 for execution by the execution logic 230.

In some cases, when a code segment has been optimized by the core 202, instructions related to the code segment may be retrieved from the translation cache 210. In these situations, the execution logic 230 may access an entry of the first table 212 that corresponds to the translated code, such as the entry 216, and obtain data for one or more pointers to respective entries of the second table 214, such as the entries 218, 220. The execution logic 230 may then access the corresponding entries of the second table 214 and detect whether the physical memory pages of the original code corresponding the optimized code segment have been modified. For example, the execution logic 230 may detect whether one or more bits of the entries of the second table 214 have been set to a particular value. When the entries of the second table 214 have particular bits set to a specified value indicating that the physical memory pages have been modified, the execution logic 230 may halt execution of the instructions associated with the optimized code segment. The execution logic 230 may also modify entries of the first table 212 corresponding to the entries of the second table 214 that are invalid and specify that the entries of the first table 212 are also invalid, such as by modifying certain bits of the entries of the first table 212. If the entries indicate that the original physical memory pages are valid, the execution logic 230 may detect whether an entry of the third table corresponding to the original code segment physical memory pages is valid. This process may not occur when trying to redirect execution to the optimized code. For example, the core may not check the XGC. The XGC may be responsible for notifying the cores regarding any change to optimized pages. In response to receiving a notification from the XGC, the cores may remove the valid bits from the PPST entry pointing to that page, and halt any ongoing optimized-region execution if it matches this PPST entry. The entry of the third table 226 may indicate that the original memory pages have been modified when particular bits of the entry are set to a specified value. If the entry is invalid, the execution logic 230 may halt execution of the instructions of the optimized code segment.

When the entries corresponding to the original physical memory pages in the second table 214 and the third table 226 are valid, page table logic 232 may detect whether the virtual to physical mapping associated with the original physical memory pages has been modified. In some cases, the execution logic 230 may include page table logic 232, while in other implementations, the page table logic 232 may be external to the execution logic 230 on the core 202, but work in conjunction with the execution logic 230. The page table logic 232 may request a virtual address for the optimized code segments from a translation lookaside buffer (TLB) of the core 202 and if there is a hit, the execution logic 230 may proceed to execute the instructions. If there is a TLB miss, the page table logic 232 may perform a page table walk to detect whether the page table of the core 202 includes the requested virtual memory address. If there is a match in the page table for the virtual memory address, the execution logic 230 may execute the instructions. Otherwise, the execution logic 230 may stop execution of the instructions associated with the optimized code segment. The execution logic 230 may also have the optimized code segment removed from the translation cache 208. In this way, code associated with physical memory pages that have been moved from one physical location to another or that have their properties changed can be tracked and execution of code that has been modified in this way, even without a write to the physical memory pages, can be avoided.

Figure 3:
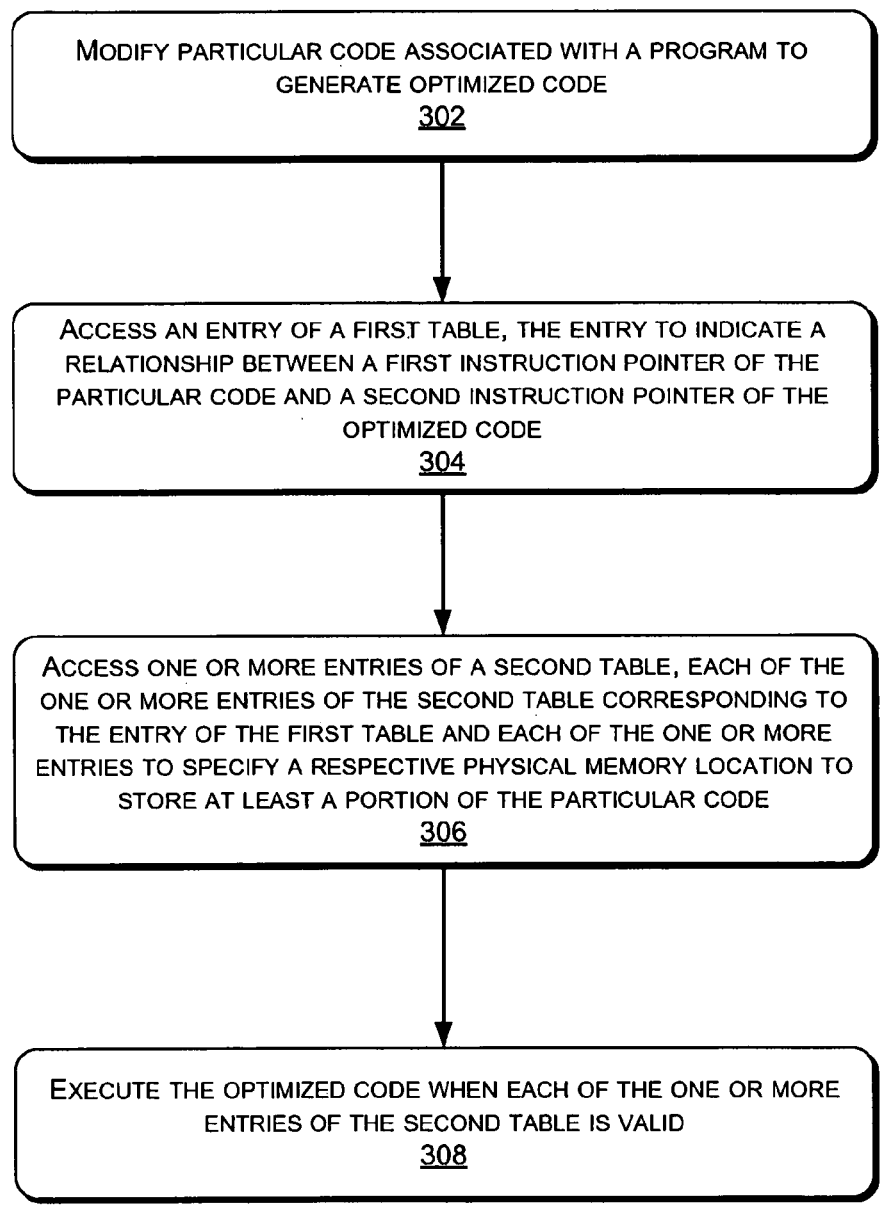
FIG. 3 is a flow diagram of a process to utilize tables to protect the integrity of original program code that has been optimized by a processor.

FIG. 3 is a flow diagram of a process 300 to utilize tables to protect the integrity of original program code that has been optimized by a processor. At 302, the process 300 includes modifying particular code associated with a program to generate optimized code. For example, a core may optimize code of the program such that the number of instructions executed with respect to the code segment are reduced and/or simplified to cause more efficient operation of the core.

Figure 4:
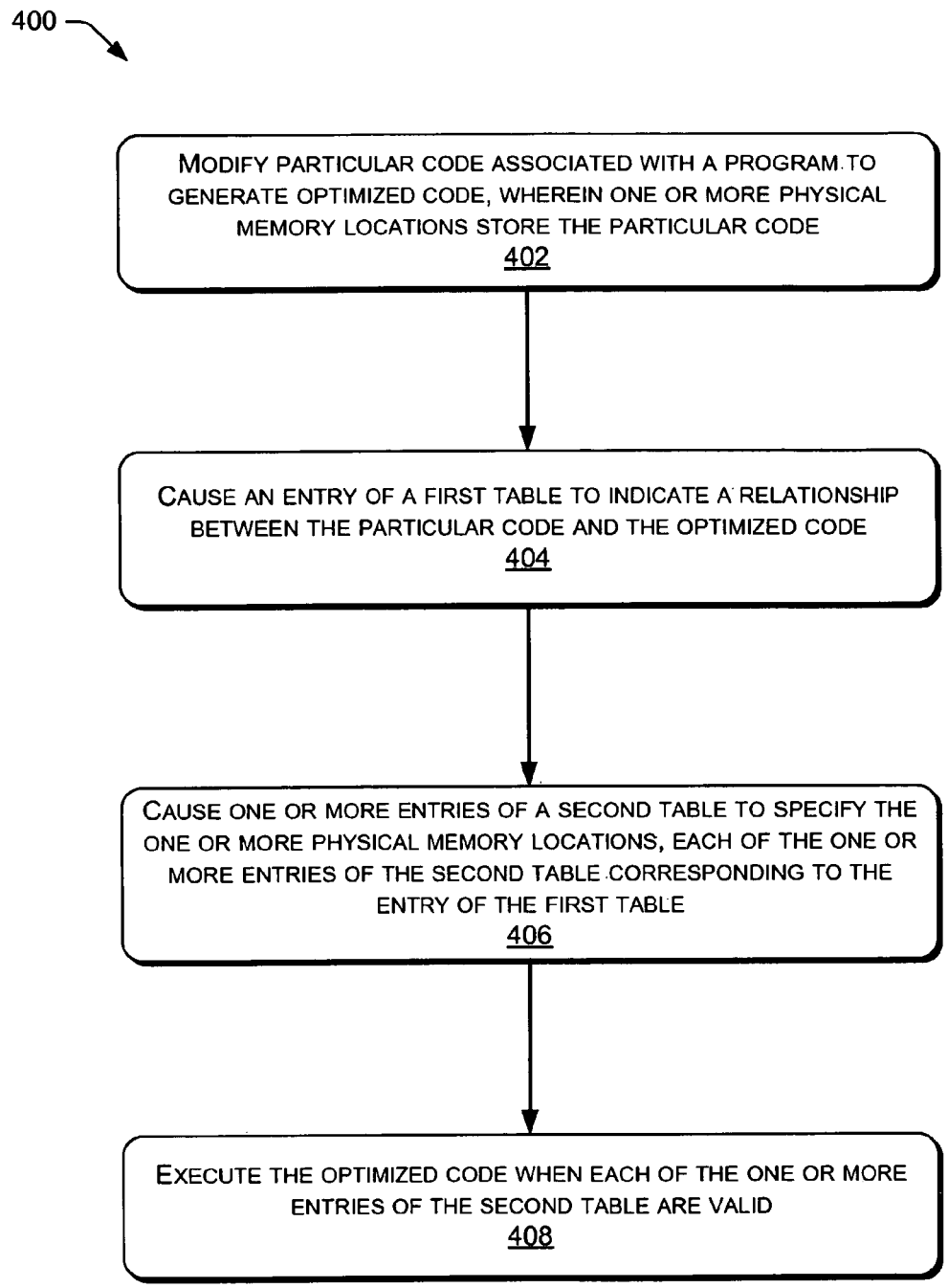
FIG. 4 is a flow diagram of a process to generate tables to protect the integrity of original program code that has been optimized by a processor.

At 304, the process 300 includes accessing an entry of a first table of the core. The entry of the first table may be associated with the particular code segment and indicate a relationship between a first instruction pointer of the code segment and a second instruction pointer of the optimized code. The entry of the first table may specify one or more entries of a second table. Thus, at 306, the process 300 includes accessing the one or more entries of the second table. Each of the one or more entries of the second table may specify a respective physical memory page/location to store at least a portion of the code segment At 308, the process 300 includes executing the optimized code when each of the one or more entries of the second table are valid. To illustrate, logic of the core may detect whether certain bits of the one or more entries have particular values. If the values of the one or more bits of the entries of the second table indicate that the physical memory pages of the original code are valid, the core may execute the optimized code. Otherwise, the core may stop execution of the optimized code. FIG. 4 is a flow diagram of a process 400 to generate tables to protect the integrity of original program code that has been optimized by a processor. At 402, the process 400 includes modifying particular code associated with a program to generate optimized code. The particular code may be stored in one or more physical pages of memory accessible by the core. At 404, the process 400 may include causing an entry of a first table to indicate a relationship between the particular code and the optimized code. For example, the first table may include entries that indicate a location of a translation cache of memory accessible by the core that is related to the physical memory locations of the original code of the program. In some situations, the entry may be added to the first table when the first table does not already include an entry that corresponds to the physical memory location. In certain circumstances, an entry of the first table may need to be removed before the entry is added to the first table. Additionally, when the first table includes an entry corresponding to the physical location of the original code, the entry may merely be modified to indicate the pointers of new entries of the second table. IP-to-TCP uses an instruction pointer. The PPST is responsible for pages. In some implementations, before insertion, the IP-to-TCP checks that the IP-to-TCP relationship is not included in any entry. Checks that are on page granularity are in the PPST. If the PPST already protects a page, no need to create a new PPST entry, but the IP-to-TCP may modified to point to an existing PPST entry.

The entries of the first table may also include one or more pointers to entries of a second table. Thus, the process 400 may include, at 406, causing the one or more entries of the second table to specify the one or more physical memory locations storing the original code that corresponds to the optimized code. In certain situations, the core may include logic to add the one or more entries to the second table, which may also result in the removal of one or more existing entries of the second table. The core may also include logic to modify existing entries of the second table that correspond to physical memory locations storing the original code segment. At 408, the process 400 includes executing the optimized code when each of the one or more entries of the second table are valid.

Figure 5:
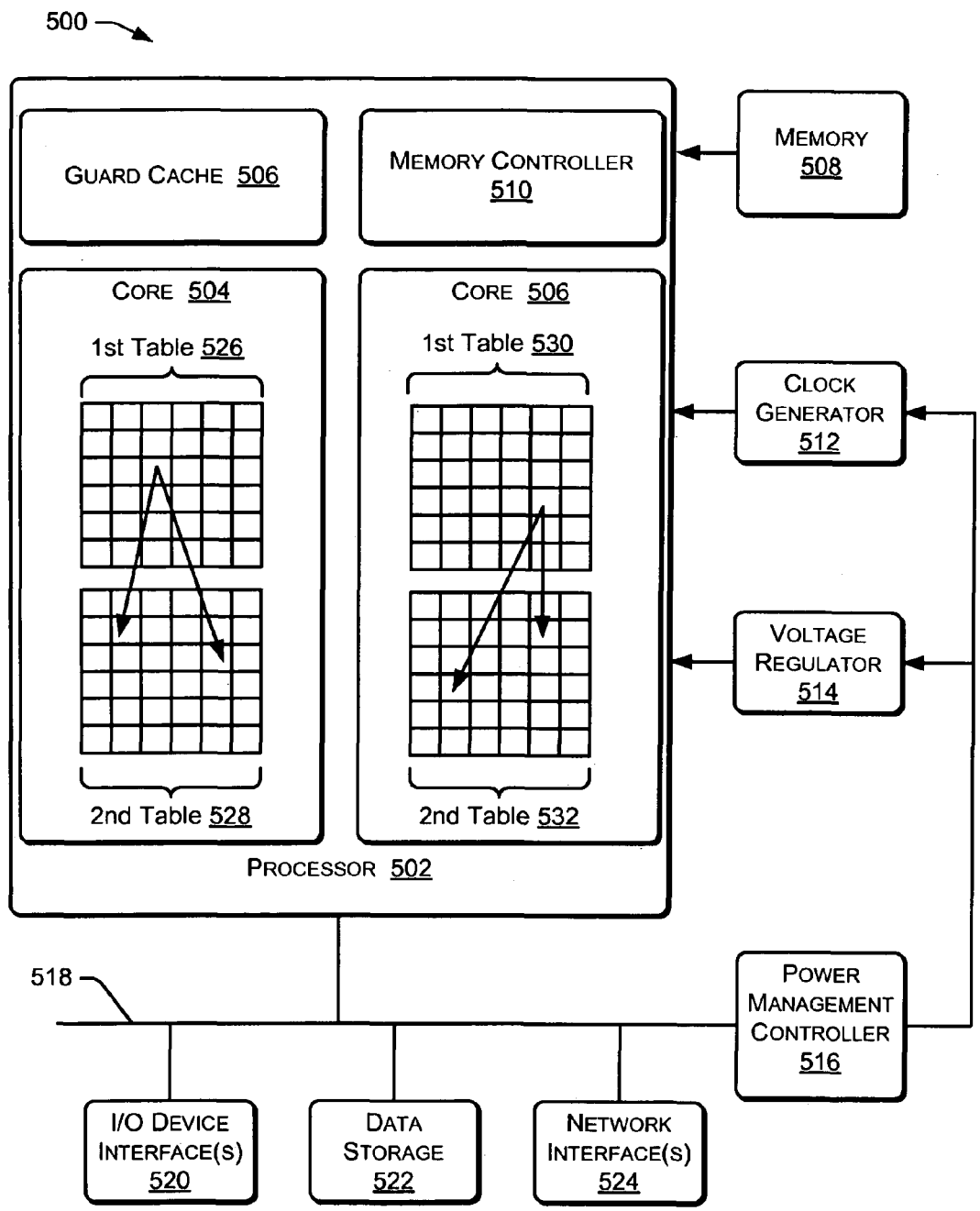
FIG. 5 illustrates a system to protect the integrity of original program code that has been optimized by a processor.

FIG. 5 illustrates a system 500 to protect the integrity of original program code that has been optimized by a processor. The system 500 includes a processor 502 that includes one or more cores, such as core 504 and core 506. The system 500 also includes memory 508, such as cache memory, main memory, or both accessible by the processor 502. The memory controller 510 may control accesses by the cores 504, 506 to data stored in the memory 508. The system 500 may also include a clock generator 512, a voltage regulator 514, and a power management controller 516 that controls operation of the clock generator 512 and the voltage regulator 514. Additionally, the system 500 includes a bus or other interconnect 518 that couples the processor 502 to one or more input/output device interfaces 520, data storage 522, such as a disk drive, and network interfaces 524. The input/output device interfaces 520 may provide access to display devices, speakers, a keyboard, a pointer device (e.g. mouse), touch pads, control buttons, scroll wheels, or combinations thereof. The network interfaces 524 may provide access to one or more networks, such as a local area network, a wireless network (e.g. a local area wireless network, a wide area wireless network), a wireline network, a remote network, such as the Internet, combinations thereof, and so forth.

The core 504 may include a first table 526 and a second table 528 and the core 506 may include a first table 530 and a second table 532. The first tables 526 and 530 may include entries that correspond to code segments that have been optimized. The first tables 526 and 530 may include entries that point to one or more entries of the respective second tables 528 and 532. Entries of the second tables 528 and 532 may be associated with physical memory pages storing original code of the segments that have been optimized. The entries of the second tables 528 and 532 may include one or more bits indicating whether the entries are valid. The entries of the second tables 528, 532 may be valid when the physical memory pages storing the original code that optimized code was derived from have not been modified since the instructions associated with the code were added to the respective pipelines of the cores 502, 504. Although, protection in the PPST is described using page granularity, it should be understood that other implementations may work with a finer (e.g., sub-page) granularity.

Each of the cores 502, 504 may include logic to add, remove, and modify entries of the first tables 526, 530 and the second tables 528, 532. The cores 502, 504 may also include logic to detect whether entries of the first tables 526, 530 and/or the second tables 538, 532 are valid and logic to execute instructions of code segments that have been optimized that are associated with valid entries of the first tables 526, 530 and the second tables 528, 532.

Figure 6:
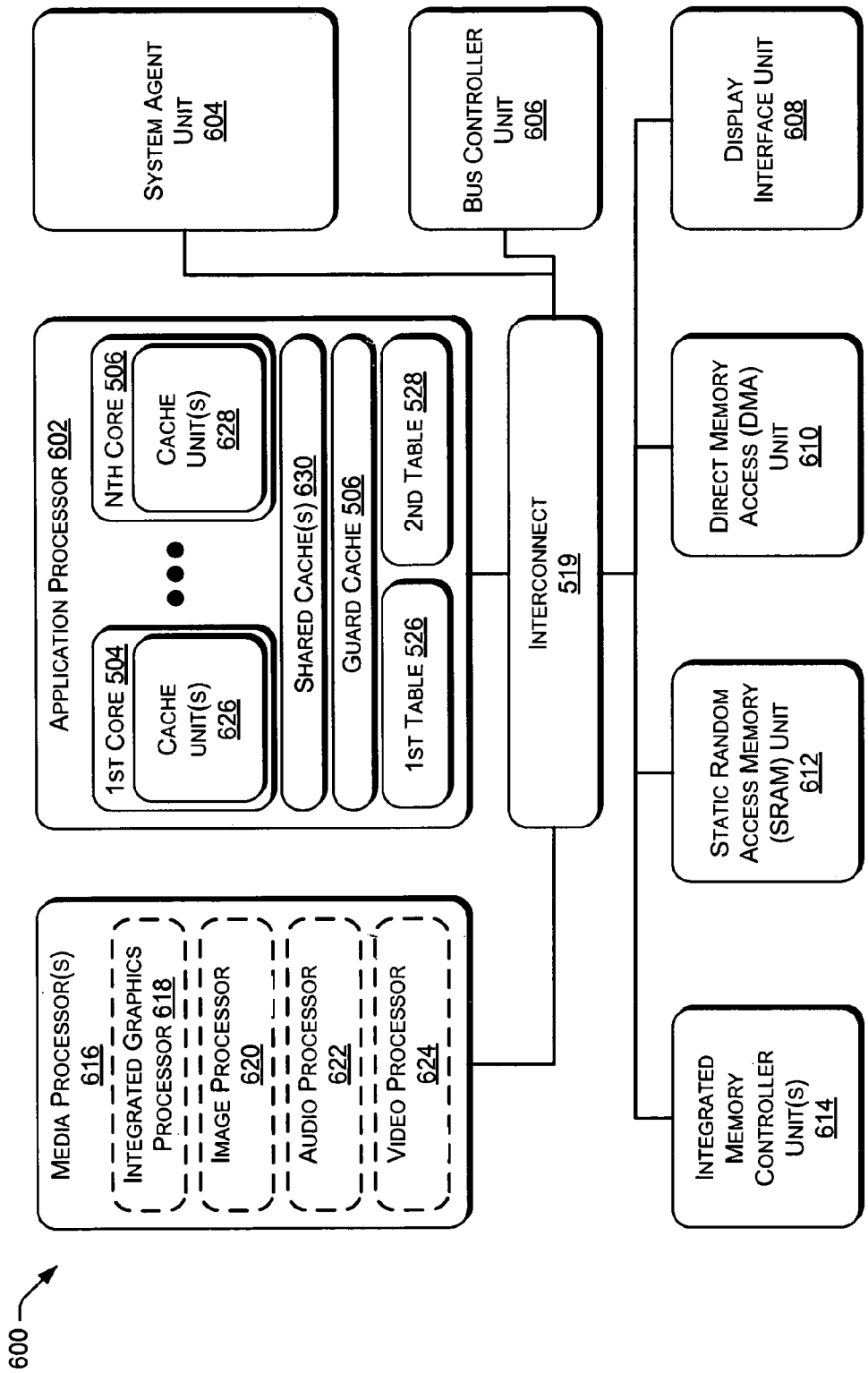
FIG. 6 illustrates a block diagram of a system on a chip in accordance with an illustrative embodiment.

FIG. 6 illustrates a block diagram of a system on a chip (SoC) 600 in accordance with an illustrative embodiment. Similar elements in previous figures bear like reference numerals. In addition, dashed lined boxes are optional features on more advanced SoCs. The SoC 600 includes an application processor 602, a system agent unit 604, a bus controller unit 606, a display interface unit 608, a direct memory access (DMA) unit 610, a static random access memory (SRAM) unit 612, one or more integrated memory controller unit(s) 614, and one or more media processor(s) 616 coupled to the interconnect 518. The media processors 616 may include an integrated graphics processor 618, an image processor 620, an audio processor 622, a video processor 624, other media processors, or any combination thereof. The image processor 620 may provide functions for manipulating and processing still images, in formats such as RAW, JPEG, TIFF, and the like. The audio processor 622 may provide hardware audio acceleration, audio signal processing, audio decoding (e.g., multichannel decoding), other audio processing, or any combination thereof. The video processor 624 may accelerate video coding/decoding, such as motion picture experts group (MPEG) decoding. The display interface unit 608 may be used to output graphics and video output to one or more external display units.

The application processor 602 may include N cores (where N is greater than zero), such as the first core 504 to the Nth core 506. Each core may access lower-level caches, such as level-one (L1) caches, level-two (L2) caches, other local caches for instructions and/or data, or any combination thereof. For example, the first core 504 may access cache units 626 and the second core 506 may access cache units 628. The N cores 504 to 506 may access one or more shared cache(s) 630, such as last-level cache (LLC).

Figure 7:
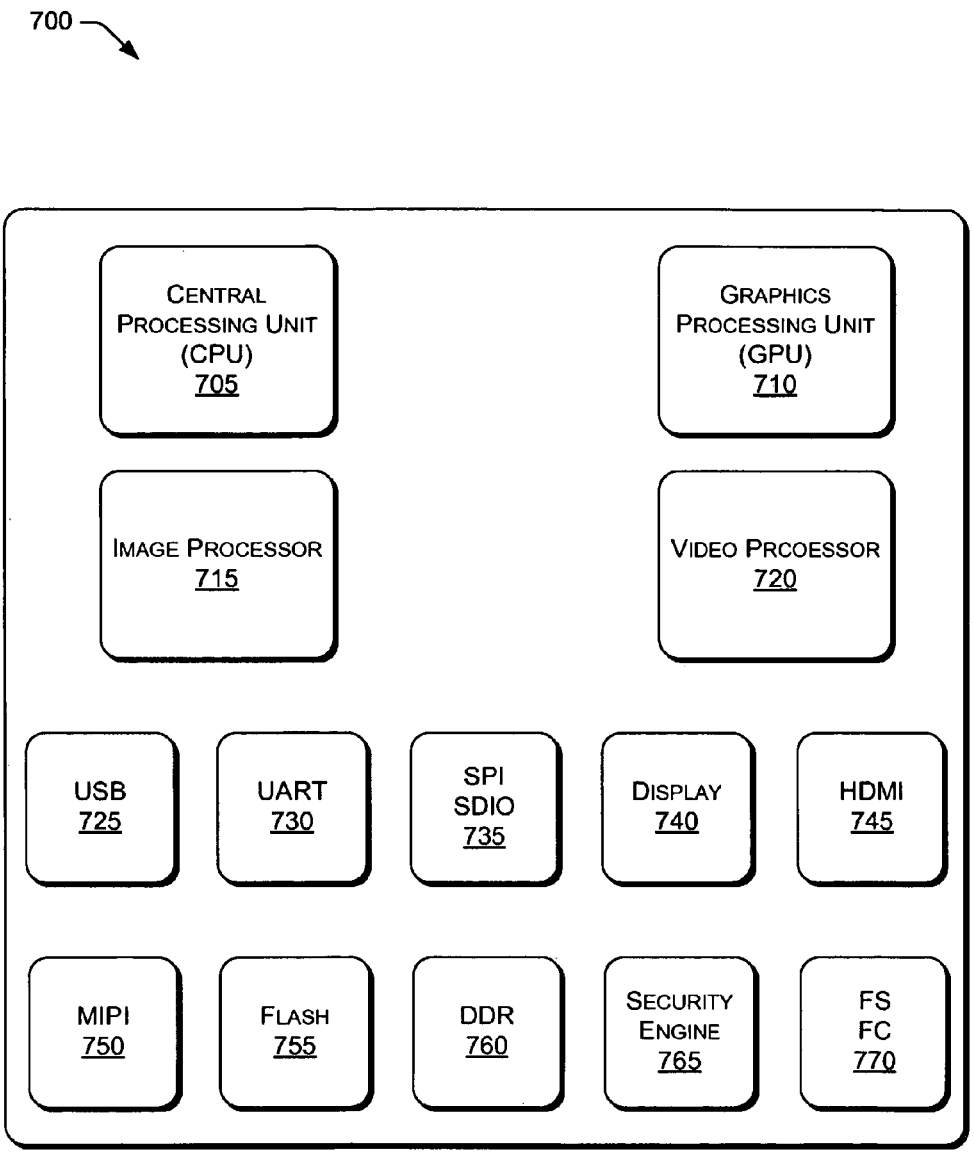
FIG. 7 illustrates a processor that includes a central processing unit and a graphics processing unit, according to an illustrative embodiment.

FIG. 7 illustrates a processor 700 that includes a central processing unit (CPU) 705 and a graphics processing unit (GPU) 710, according to an illustrative embodiment. One or more instructions may be executed by the CPU 705, the GPU 710, or a combination of both. For example, in one embodiment, one or more instructions may be received and decoded for execution on the GPU 710. However, one or more operations within the decoded instruction may be performed by the CPU 705 and the result returned to the GPU 710 for final retirement of the instruction. Conversely, in some embodiments, the CPU 705 may act as the primary processor and the GPU 710 as the co-processor.

In some embodiments, instructions that benefit from highly parallel, throughput processors may be performed by the GPU 710, while instructions that benefit from the performance of processors that benefit from deeply pipelined architectures may be performed by the CPU 705. For example, graphics, scientific applications, financial applications and other parallel workloads may benefit from the performance of the GPU 710 and be executed accordingly, whereas more sequential applications, such as operating system kernel or application code may be better suited for the CPU 705.

In FIG. 7, the processor 700 includes the CPU 705, the GPU 710, image processor 715, video processor 720, USB controller 725, UART controller 730, SPI/SDIO controller 735, display device 740, memory interface controller 745, MIPI controller 750, flash memory controller 755, dual data rate (DDR) controller 760, security engine 765, and I2S/I2C controller 770. Other logic and circuits may be included in the processor of FIG. 7, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor.

What is claimed is:

1. A processor comprising:
    code optimization logic to modify particular code associated with a program to generate optimized code;
    first table logic to access an entry of a first table, the entry to indicate a relationship between a first instruction pointer of the particular code and a second instruction pointer of the optimized code;
    second table logic to access one or more entries of a second table, each of the one or more entries of the second table corresponding to the entry of the first table and each of the one or more entries of the second table to specify a respective physical memory location to store at least a portion of the particular code; and
    execution logic to execute the optimized code when each of the one or more entries of the second table is valid.

2. The processor as recited in claim 1, the execution logic to cancel execution of the optimized code when at least one entry of the one or more entries of the second table is invalid.

3. The processor as recited in claim 2, wherein the at least one entry of the second table is invalid when the respective physical memory location associated with the at least one entry has been modified.

4. The processor as recited in claim 1, further comprising third table logic to access a third table to identify one or more entries of the third table, a portion of the one or more entries corresponding to the respective physical memory locations to store at least a portion of the particular code, and the third table includes a plurality of entries indicating physical memory locations of respective optimized code produced by a plurality of cores.

5. The processor as recited in claim 4, the execution logic to cancel execution of the optimized code when at least one entry of the one or more entries of the third table is invalid.

6. The processor as recited in claim 5, wherein the at least one entry of the third table is invalid when the respective physical memory location associated with the at least one entry has been modified.

7. A system comprising:
    a plurality of cores, at least a portion of the plurality of cores comprising:
        a first table including a first plurality of entries, a particular entry of the first plurality of entries to indicate a relationship between a first instruction pointer of particular code of a program and a second instruction pointer of optimized code generated from the particular code; and
        a second table including a second plurality of entries, one or more entries of the second plurality of entries corresponding to the particular entry of the first table and each of the one or more entries of the second table to specify a respective physical memory location to store at least a portion of the particular code;
        a third table including a plurality of entries indicating physical memory locations of respective optimized code produced by one or more cores of the plurality of cores; and
    logic to:
        cause an entry of the third table to indicate a particular physical memory location when a first core optimizes code stored in the particular memory location;
        detect a message from a second core to indicate the particular physical memory location has been modified; and
        invalidate the entry of the third table at least partly in response to detection of the message from the second core.

8. The system as recited in claim 7, further comprising memory including a translation cache, the translation cache storing the optimized code.

9. The system as recited in claim 7, further comprising:
    a bus; and
    a last-level cache to monitor messages communicated via the bus to identify messages indicating modifications to physical memory locations.

10. The system as recited in claim 7, further comprising virtual page matching logic to search a translation lookaside buffer to detect an entry of the translation lookaside buffer corresponding to a virtual address of the one or more physical memory locations.

11. The system as recited in claim 10, the virtual page matching logic to search one or more page tables to identify an entry of the one or more page tables corresponding to the virtual address of the one or more physical memory locations when the translation lookaside buffer does not include an entry corresponding to the virtual address.

12. The system as recited in claim 11, further comprising execution logic to execute the optimized code when the translation lookaside buffer or the one or more page tables include a particular entry corresponding to the virtual address and the particular entry of the first table is valid and the one or more entries of the second table are valid.

13. A method comprising:
    modifying particular code associated with a program to generate optimized code, wherein one or more physical memory locations store the particular code;
    causing an entry of a first table to indicate a relationship between the particular code and the optimized code;
    causing one or more entries of a second table to specify the one or more physical memory locations, each of the one or more entries of the second table corresponding to the entry of the first table; and
    executing the optimized code when each of the one or more entries of the second table are valid.

14. The method as recited in claim 13, further comprising:
    canceling execution of the optimized code when at least one of the one or more entries of the second table are invalid.

15. The method as recited in claim 13, further comprising:
    removing a particular entry of the second table; and
    adding the entry of the second table after removing the particular entry of the second table.

16. The method as recited in claim 15, further comprising invalidating an entry of the first table corresponding to the particular entry of the second table after removing the particular entry from the second table.

17. The method as recited in claim 16, further comprising causing an entry of a third table to indicate a particular physical memory location in response to a core of a processor modifying data stored in the particular memory location.

18. The method as recited in claim 17, further comprising sending a message to additional cores of the processor indicating that the data stored in the particular memory location has been modified.

19. The method as recited in claim 13, further comprising executing the optimized code when the entry of the second table and the entry of the third table are valid.

20. The method as recited in claim 13, further comprising searching the first table for a particular entry corresponding to a physical memory location storing at least a portion of the particular code.

\* \* \* \* \*